United States Patent

[11] 3,619,674

| [72] | Inventors | Bror Daimo;<br>John Franked; Hans Landbult; Birger Nordberg, all of Vasteras, Sweden |
|---|---|---|
| [21] | Appl. No. | 868,741 |
| [22] | Filed | Oct. 23, 1969 |
| [45] | Patented | Nov. 9, 1971 |
| [73] | Assignee | Allmanna Svenska Elektriska Aktiebolaget<br>Vasteras, Sweden |
| [32] | Priority | Oct. 28, 1968 |
| [33] |  | Sweden |
| [31] |  | 14526/68 |

[54] ROTATING ELECTRIC MACHINE WITH DIRECTLY LIQUID-COOLED STATOR WINDING
7 Claims, 5 Drawing Figs.

[52] U.S. Cl. .................................................. 310/54, 310/58
[51] Int. Cl. .................................................. H02k 9/00
[50] Field of Search ........................................ 310/54, 58, 59, 64, 63, 65, 52, 53, 60

[56] References Cited
UNITED STATES PATENTS

| 2,217,430 | 10/1940 | Baudry | 310/54 |
| 3,112,415 | 11/1963 | Bahn | 310/54 |
| 3,184,624 | 5/1965 | Solomon | 310/59 |
| 3,430,085 | 2/1969 | Mains | 310/54 |

FOREIGN PATENTS

| 1,223,797 | 6/1960 | France | 310/54 |

Primary Examiner—D. X. Sliney
Assistant Examiner—R. Skudy
Attorney—Jennings Bailey, Jr.

ABSTRACT: A stator core with a directly liquid-cooled stator winding has a plurality of slits axially spaced along it perpendicular to the axis. Each slit contains a plurality of cooling blocks arranged together to extend around the periphery of the core. A substantially annular cooling tube is arranged in grooves in the blocks extending substantially tangentially, and is clamped in these grooves.

PATENTED NOV 9 1971 3,619,674

INVENTOR
BROR DAIMO, JOHN FRANKED
BY HANS LANDHULT
BIRGER NORDBERG, OVE TJERNSTRÖM

Jennings Bailey Jr

ROTATING ELECTRIC MACHINE WITH DIRECTLY LIQUID-COOLED STATOR WINDING

BACKGROUND OF THE INVENTION

1. Field of the Invention

The present invention relates to a rotating electric machine with a directly liquid-cooled stator winding and a stator core having a plurality of slits arranged axially one after the other and perpendicular to the shaft of the machine, each slit containing a plurality of cooling members arranged tangentially one after the other, the cooling members having effective heat-conducting contact with the limiting surfaces of the slits and with at least one cooling tube surrounded by a cooling member, the ends of the tube being connected to a supply or return conduit for cooling liquid.

2. The Prior Art

It is known in such machines to effect liquid-cooling of the stack of stator laminations by shaping the stator core similarly to air-cooled stators, with axially successive groups of stator laminations, the spaces between the groups, which in air-cooled machines form channels for air flowing through, being taken up by cooling elements in the form of a plurality of cooling bodies arranged tangentially one after the other, in which liquid coolant is intended to flow. These may also serve as spacers between groups of laminations arranged axially one after the other in the stator core. In an older version the cooling elements are in the form of flat boxes which are welded together from sheet metal, which involves high manufacturing costs and great risk of leakage.

According to a more recent version the cooling elements are constructed as a cast body of material having high heat conductivity, a cooling tube being cast into said body. This construction is also relatively expensive to manufacture, both because of the manufacture of the elements themselves and because of the many welds required to join together the various elements. Furthermore, it is unavoidable that these welds reduce the operational safety.

In another known construction where the stator core is divided into separate groups of laminations arranged axially one after the other, several concentrical, annular cooling tubes are arranged in the spaces between the groups. In this construction the tubes are subjected to varying mechanical stress as a result of their function as spacers and because the clamping force exerted on the stack of core laminations varies with the temperature. If there is to be sufficient heat-transfer surface between cooling tubes and core, there must be a great length of tubing which makes the machine considerably more expensive, particularly if it is taken into consideration that the tubes should have rectangular cross section and must be made of high-quality material. They must be shaped with great accuracy, which is very time consuming. Further, the total tube cross section will be considerably greater than the optimum at the pressure differences at which the other cooling circuits of the machine operate. There is thus some difficulty in getting the compression forces of the stator core to be distributed evenly over all the cooling parts and there is a risk that certain parts will have too much freedom of movement and thus give rise to disturbing noise.

SUMMARY OF THE INVENTION

These disadvantages are avoided according to the present invention which is characterized in that said cooling member comprises a cooling block made of solid material having good heat conductivity and shaped with a number of tangential grooves, each cooling tube being clamped in several grooves situated tangentially one after the other and in different cooling blocks.

According to a further development of the invention said grooves are located in a surface of the cooling block lying in a radial plane and a lid abutting said surface and consisting of material having high heat conductivity is arranged to exert pressure on the cooling tube. Said lid thus provides effective heat transport in both radial and tangential directions so that the surface of the cooling tube located near the groove opening is considerably more effective than if it were in direct contact with the stator core.

BRIEF DESCRIPTION OF THE DRAWINGS

In the following the invention will be described with reference to the accompanying drawings where.

DESCRIPTION OF THE PREFERRED EMBODIMENTS

Figure 1:
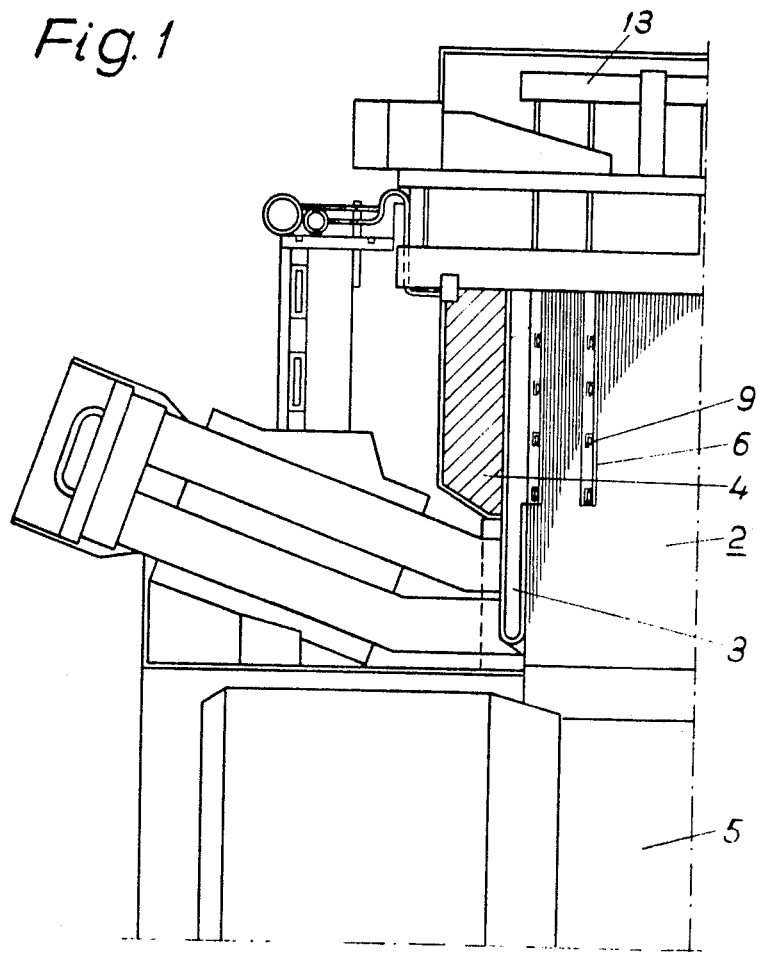
FIG. 1 shows a machine according to the invention in partial axial section, and FIG. 2 a stator core according to the invention, in partial section perpendicular to the machine shaft.

In the drawings, 1 designates a direct liquid-cooled stator winding in a synchronous generator and 2 a laminated stator core in the same machine. The stack of stator laminations is compressed by means of water-cooled pressure fingers 3 and pressure rings 4. The rotor of the machine is designated 5. The stator core is designed with a plurality of slits 6 arranged axially one after the other in a similar manner to a conventionally air-cooled core. Each slit has a plurality of cooling members 7 situated in immediate succession along the periphery of the stator core. The cooling member 7 comprises a cooling block 8 having straight grooves, each surrounding a cooling tube 9. One of the sides of the block lying in a radial plane abuts an adjacent lamination in the stack and the other side abuts a lid 10 which, like the cooling block, is made of aluminum, for example punched out of aluminum sheet. The tube 9 is of such thickness that it is subjected to pressure by the application of the cover 10. Several groove sections situated in tangential succession and in different cooling blocks together form a substantially ring-shaped cooling loop, the ends of which are situated in transverse grooves 11 and 12 running in one end and the same cooling block and connected to supply and return conduits 13 and 14, respectively, for coolant. Each slit 6 contains four substantially annular cooling tubes.

The arrangement described permits extremely low manufacturing and assembly costs. As mentioned, the cooling blocks 8 can be punched out of aluminum sheet, the grooves for the cooling tubes being milled at the same time. It is of course possible to use curved grooves, but straight grooves are to be preferred from the manufacturing point of view. The cooling tube loops are shaped when the tubes are inserted in the grooves. In certain cases it may be advantageous to manufacture billet material for the cooling blocks by an extrusion or drawing process, using a profiling tool corresponding to the desired groove section. If a profiled rod of sufficient width cannot be shaped with the available tools, or if it is desirable to use the same section for machines having different requirements concerning the radial dimension of the slits 6 for the cooling elements, it is possible to use several cooling blocks placed radially adjacent to each other and join them together as shown in FIG. 4 by means of longitudinal grooves 15 and projections 16 shaped during the extrusion or drawing process.

Figure 4:
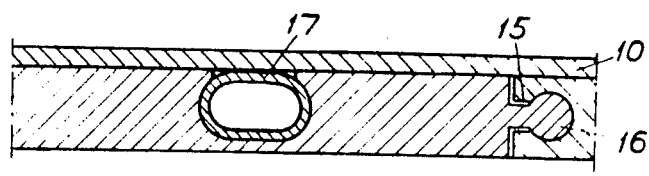
FIGS. 4 and 5 show in the same way two embodiments differing from that shown in FIG. 3.
Figure 5:
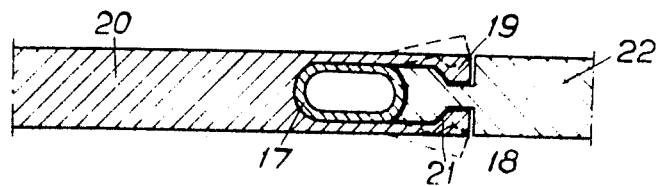
Figure 2:
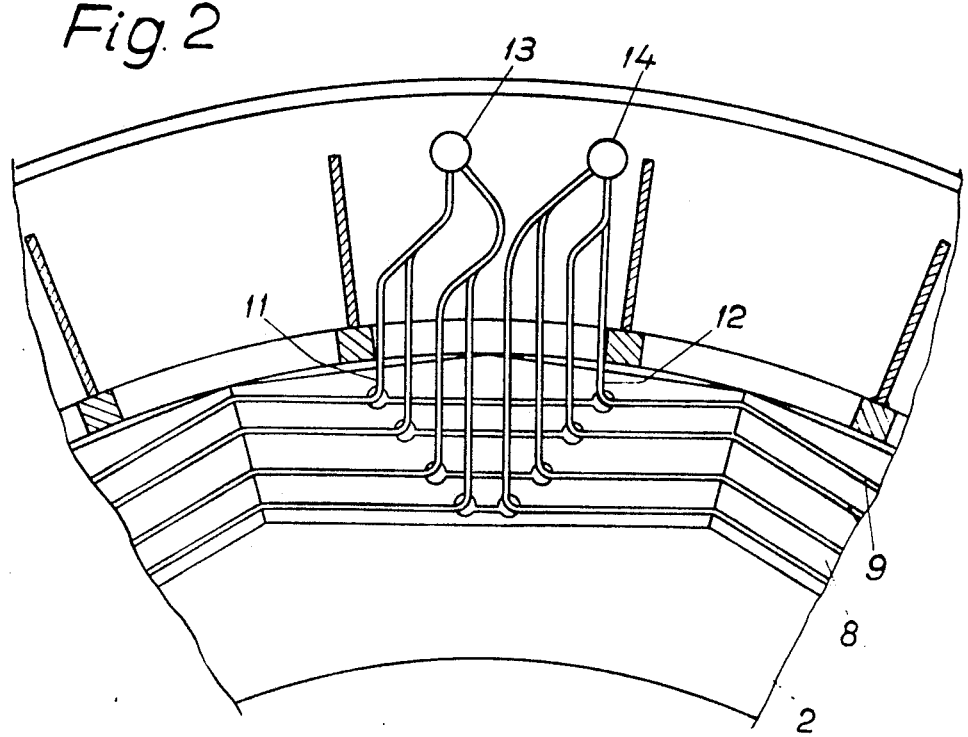
Figure 3:
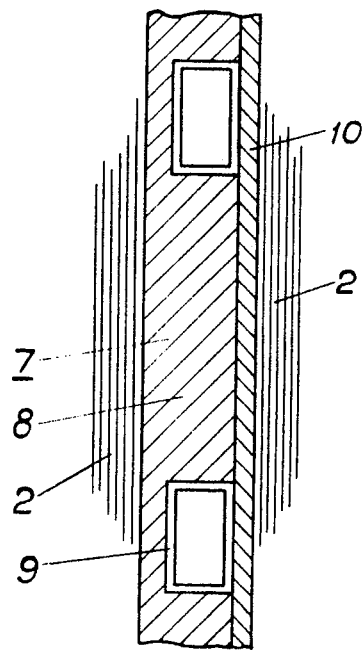
FIG. 3 shows a partial axial section through a cooling member according to the invention, with its cooling tubes

As shown in FIG. 4 the cooling tube 17 preferably has an oval cross section and the groove in the cooling block may be shaped with an opening narrower than the maximum width of the cooling tube. The cooling block is then bent along the bottom of the groove prior to the insertion of the tube and is straightened when the cooling tube has been inserted in the groove so that effective heat contact is obtained between groove and tube. In FIG. 5 the groove for the cooling tube is arranged with the groove opening directed radially and it is also effective in joining together several radially adjacent cooling blocks. When the tube is inserted the flaps 18 and 19 of the block 20 are bent away from each other as indicated in broken lines. When the flaps are pressed together a radial force acts between the blocks 20 and 22 due to the oblique surfaces 21 and the cooling block 22 is pressed against the cooling tube 17.

We claim:

1. A liquid-cooled alternating current generator stator core having a plurality of slits arranged axially one after the other and perpendicular to the shaft of the machine, each slit containing at least one cooling tube running around the stator, the two ends of the tube being connected to a supply and a return conduit for cooling liquid respectively, and a plurality of cooling members arranged tangentially one after the other, the cooling members having heat-conducting contact with the limiting surfaces of the slits, each cooling member (7) comprising a cooling block of good heat conductivity having at least one substantially tangential groove therein, said cooling tube (9) being clamped in a plurality of grooves situated tangentially one after the other in different cooling blocks.

2. Rotating electric machine according to claim 1, in which said grooves open in a surface of the cooling block lying in a radial plane and a lid (10) abutting said surface and formed of material having high heat conductivity contacts and exerts pressure on the cooling tube.

3. Rotating electric machine according to claim 1, in which said cooling tube runs through all the cooling members arranged beside each other tangentially.

4. Rotating electric machine according to claim 1, in which each cooling block is formed of an extruded body, the cross section of which has at least one groove therein.

5. Rotating electric machine according to claim 1, in which several cooling blocks are arranged radially one outside the other.

6. Rotating electric machine according to claim 5, in which said grooves are located in cooling block surfaces which are parallel with tangential planes of the stator core.

7. Rotating electric machine according to claim 1, in which the cooling tube has substantially oval cross section and the groove has an opening with radial dimension which is less than the maximum radial dimension of the tube.

* * * * *

UNITED STATES PATENT OFFICE
CERTIFICATE OF CORRECTION

Patent No. 3,619,674            Dated November 9, 1971

Inventor(s) Bror Dalmo et al

It is certified that error appears in the above-identified patent and that said Letters Patent are hereby corrected as shown below:

In the Heading of the patent and on the drawings, the last name of the first inventor should read "Dalmo".

Signed and sealed this 2nd day of May 1972.

(SEAL)
Attest:

EDWARD M. FLETCHER, JR.           ROBERT GOTTSCHALK
Attesting Officer                   Commissioner of Patents